Sept. 25, 1928.  E. B. CARNS  1,685,120

NUT LOCK

Filed April 9, 1927

Inventor,
Edmund B. Carns,
By his Attorney,
Ramsay Hoguet.

Patented Sept. 25, 1928.

1,685,120

UNITED STATES PATENT OFFICE.

EDMUND B. CARNS, OF NEW YORK, N. Y.

NUT LOCK.

Application filed April 9, 1927. Serial No. 182,211.

My invention relates to improvements in nut locks and in combination nut locks and bolts.

The object of the invention is to produce a very simple nut lock which can be quickly applied and which will serve its purpose of preventing the loosening of the nuts of a bolt.

In carrying out my idea, I use a washer of soft or bendable metal having a plurality of peripheral fingers, preferably of different sizes which can be bent in opposite directions to engage adjacent nuts and I, also, preferably use, in connection with such a washer, a bolt having two threaded parts with the outer part smaller or extended so that the washer can fit against the shoulder at the end of the extension and be bound in place by the outer or lock nut when the latter is applied.

The invention is intended to be a cheap, simple structure which can be instantly applied and which will serve its purpose.

Reference is to be had to the accompanying drawings in which similar reference characters represent the corresponding parts in all views.

Figure 1:
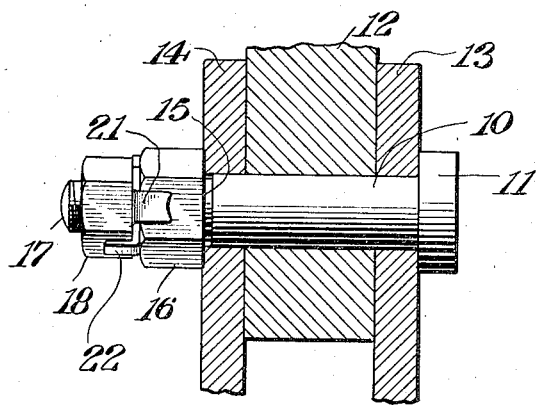
Figure 1 is a sectional elevation showing my improved nut lock and bolt as applied to adjacent parts.
Figure 2:
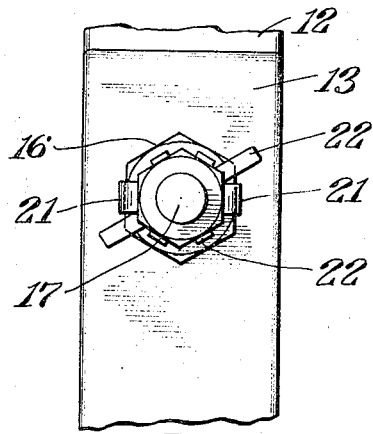
Figure 2 is a face or end view of the structure.
Figure 3:
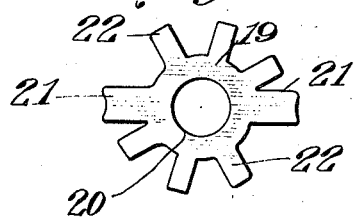
Figure 3 is a detail plan view of the locking washer.

My improved nut lock is used to advantage on the bolt 10 which can be of any usual or preferred kind and which I have shown having a head 11 and serving to fasten together the parts 12, 13 and 14 which, obviously, may represent any members to be held together by a bolt.

In the drawing, it will be noticed that I have shown a bolt having a head on one end and nuts on the other, but it will be apparent that the bolt can be made to have nuts applied to both ends if desired. In the type of bolt shown, I have illustrated a part 15 threaded in the customary manner to receive the nut 16 and a reduced stud or extension 17 likewise threaded and adapted to receive a second or lock nut 18.

In connection with the bolt, I use a washer 19 of ductile metal or at least metal capable of being bent without injury and this washer has an opening or hole 20 therethrough so that it may be placed over the stud or extension 17 but the hole is not large enough to receive the part 15 of the bolt.

The lock washer has peripheral, spaced arms radiating from its outer edge and at least two of these which I have marked 21 should be diametrically opposed and these are preferably larger than the other arms.

The arms 22 are sufficient in number so that in any position of the nut 18 at least two of the arms can be turned up to engage the flat sides of the nut.

When the nut lock is used, the nut 16 is turned home, and the washer slipped on over the stud or extension 17 so as to strike the end or shoulder of the part 16.

The arms 21 are placed so that they may be bent in to firmly grip opposite sides of the nut 16. The lock nut 18 is then turned home on the stud 17 and presses the washer firmly against the shoulder of the bolt after which some of the arms 22 which come opposite the flat faces of the nut 18 are turned up and flattened against the nut. Thus, it will be seen that the washer is bent by the pressure of the nut 18.

It is, also, held from turning by the arms 21, and the arms 22 hold the nut 18 against turning so that it will be noticed that the device can be quickly applied, easily secured in place, and that it will prevent any accidental loosening of the nuts.

It will be noticed that the members 22 are irregularly spaced, as I find that by this arrangement some of them are surer to register with the flat faces of the nut.

I claim:

As an improved article of manufacture, a nut lock flat washer of soft metal having on its periphery diametrically opposed relatively large arms and having other and smaller arms irregularly spaced extending from its periphery between the first mentioned arms, all said arms lying normally in the plane of the washer body.

In testimony whereof, I have signed my name to this specification this 7th day of April, 1927.

EDMUND B. CARNS.